US012699857B2

(12) United States Patent
White et al.

(10) Patent No.: US 12,699,857 B2
(45) Date of Patent: Aug. 4, 2026

(54) MACHINE VISION SYSTEM OPTIMIZATION

(71) Applicant: Zebra Technologies Corporation, Lincolnshire, IL (US)

(72) Inventors: Joseph R. White, Glenwood, MD (US); Dimitry Kapmar, Northbrook, IL (US); Thomas Conticello, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/986,461

(22) Filed: Dec. 18, 2024

(65) Prior Publication Data

US 2026/0170280 A1 Jun. 18, 2026

(51) Int. Cl.

| | |
|---|---|
| *G06V 10/70* | (2022.01) |
| *G06K 7/10* | (2006.01) |
| *G06K 7/14* | (2006.01) |
| *G06V 10/147* | (2022.01) |
| *G06V 10/764* | (2022.01) |
| *H04N 13/207* | (2018.01) |
| *H04N 23/45* | (2023.01) |
| *H04N 23/51* | (2023.01) |
| *H04N 23/61* | (2023.01) |

(52) U.S. Cl.
CPC ..... *G06K 7/10366* (2013.01); *G06K 7/10722* (2013.01); *G06K 7/1413* (2013.01); *G06V 10/147* (2022.01); *G06V 10/764* (2022.01); *G06V 10/87* (2022.01); *H04N 13/207* (2018.05); *H04N 23/45* (2023.01); *H04N 23/51* (2023.01); *H04N 23/61* (2023.01)

(58) Field of Classification Search
CPC ..... G06V 10/87; G06V 10/147; G06V 10/764
USPC ......................................... 235/451
See application file for complete search history.

(56) References Cited

U.S. PATENT DOCUMENTS 7,345,576 B2 * 3/2008 Allen ..................... G06K 17/00
340/10.2

* cited by examiner

*Primary Examiner* — Toan C Ly

(57) ABSTRACT

Systems and methods for configuring a data acquisition system having a plurality of sensors. A first sensor determines an object type of an object. A plurality of other sensors, each using a different sensor modality, are configured to capture data corresponding to one or more properties of the object. Responsive to a determination of the object type, a sensor having a modality optimized for analyzing the object based on the object type is selected from the plurality of sensors. From there, a machine vision job based on the sensor modality and based on the object type is executed by the data acquisition system.

29 Claims, 7 Drawing Sheets

*500*

_600_

_700_

MACHINE VISION SYSTEM OPTIMIZATION

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Machine vision (MV) systems may utilize a variety of different sensor types. Certain sensor types are better suited for sensing particular types of objects in comparison to other types of objects. Example sensors include radio frequency-based sensors, such as radio frequency identification (RFID) sensors, and imaging-based sensors, such as two-dimensional cameras or three-dimensional imagers. Each sensor, in these examples, corresponds to a different sensor modality, and each sensor modality may have its own set of operating parameters and impose its own demands on system processing load and power requirements. There is a need to optimize both sensor type selection and sensor parameter selection for machine vision jobs involving particular types of objects. This need, if met, may help minimize processing speed and/or system power requirements. Nevertheless, while prior art systems may have been proposed, there are deficiencies. Prior art systems may select sensor parameters based on object type, but they do not select among multiple sensor modalities suitable for that machine vision job.

Additionally, in view of the upcoming Digital Product Passport (DPP) and similar standards relating to tracking supply chain events, there is a heightened need to optimize machine vision jobs with respect to various supply chain data associated with an object.

BRIEF SUMMARY

In one aspect, a data acquisition system includes: a first sensor configured to determine an object type of an object; a plurality of sensors each configured to capture data corresponding to one or more properties of the object, each of the plurality of sensors using a different sensor modality; a processor and a memory storing instructions that, when executed, cause the processor to: responsive to a determination of the object type, select, from the plurality of sensors, a sensor having a modality optimized for analyzing the object based on the object type; and execute a machine vision job based on the sensor modality and based on the object type.

In a variation of the aspect, the machine vision job is selected from a plurality of machine vision jobs based on the sensor modality and based on the object type.

In a variation of the aspect, the plurality of sensors are contained within an imager assembly.

In a variation of the aspect, each of the plurality of sensors are contained within a separate imager assembly.

In a variation of the aspect, the first sensor is contained within an imager assembly separate from the plurality of sensors, and wherein the first sensor has a sensor modality that is different from each of the sensor modalities of the plurality of sensors.

In a variation of the aspect, the first sensor is selected from a group consisting of a radio frequency identification (RFID) reader, an imaging sensor, and a barcode reader.

In a variation of the aspect, the instructions that, when executed, cause the processor to select the sensor comprise selecting one or more sensors from the plurality of sensors.

In a variation of the aspect, the instructions that, when executed, cause the processor to select the sensor comprise selecting each of the plurality of sensors.

In a variation of the aspect, each of the plurality of sensors corresponds to a different imaging devices.

In a variation of the aspect, the instructions that, when executed, cause the processor to select the sensor comprise instructions to select sensor parameters for operating the sensor having the modality optimized for analyzing the object.

In a variation of the aspect, the plurality sensors comprise at least one three-dimensional (3D) image sensor and at least one two-dimensional (2D) image sensor, and wherein the sensor parameters comprise at least one of exposure, gain, and illumination.

In another aspect, a method for configuring a data acquisition system having a plurality of sensors, where the method may include: determining, via a first sensor, an object type; responsive to a determination of the object type, selecting from a plurality of sensors each using a different sensor modality, a sensor having a modality optimized for analyzing the object based on the object type; and executing, on that data acquisition system, a machine vision job selected based on the sensor modality and based on the object type, to analyze the object In a variation of the aspect, executing the machine vision job comprises selecting the machine vision job, from a plurality of machine vision jobs, based on the sensor modality and based on the object type.

In a variation of the aspect, selecting the sensor further comprises: selecting one or more sensors from the plurality of sensors.

In a variation of the aspect, selecting the sensor further comprises: selecting each of the plurality of sensors.

In a variation of the aspect, selecting the sensor further comprises: selecting one or more sensors from a plurality of different imaging devices.

In a variation of the aspect, the method further comprises selecting sensor parameters for operating the sensor having the modality optimized for analyzing the object.

In yet another aspect, a method for configuring a data acquisition system having a plurality of sensors, where the method may include: determining, via a first sensor, a payload data of an object; determining, whether the payload data contains lifecycle data for the object; responsive to a determination of the payload data containing the lifecycle data, selecting sensor parameters based on the lifecycle data and activating a sensor according to the selected sensor parameters based on the lifecycle data; and executing a machine vision job to analyze the object.

In a variation of the aspect, the method further comprises responsive to the payload data not containing the lifecycle data, selecting default sensor parameters and activating the sensor according to the default sensor parameters.

In a variation of the aspect, the lifecycle data is Digital Product Passport (DPP) data that indicates one of a repair status of the object, a recycle status of the object, or one or more materials of the object.

In a variation of the aspect, the lifecycle data is DPP data that indicates one or more materials of the object, wherein selecting the sensor parameters based on the lifecycle data comprises selecting the sensor parameters based on the one or more materials of the object.

In a variation of the aspect, the lifecycle data is DPP data that indicates a repair status of the object, wherein selecting the sensor parameters based on the lifecycle data comprises selecting the sensor parameters to evaluate the repair status of the object.

In a variation of the aspect, the lifecycle data is DPP data that indicates the recycle status of the object, wherein selecting the sensor parameters based on the lifecycle data comprises selecting the sensor parameters based on the recycle status.

In a variation of the aspect, the lifecycle data is derived from a Global Standards 1 (GS1) data link.

In a variation of the aspect, the payload data is a radio frequency identification (RFID) tag data or a payload derived from an indicia.

In yet another aspect, method for configuring a data acquisition system having a plurality of sensors, where the method may include: determining, at a first sensor, a payload data of an object; determining, whether the payload data contains lifecycle data for the object; responsive to the payload data containing the lifecycle data, determining an object status and executing a model trained to assess one or more lifecycle-based properties of the object; responsive to the payload data not containing lifecycle data, selecting default properties; feeding the one or more lifecycle-based properties of the object or the default properties to a through-put system; and performing a throughput operation on the object using the throughput system.

In a variation of the aspect, the method further includes: responsive to the payload data not containing lifecycle DPP data, selecting default properties; and feeding the default properties to the throughput system for performing the throughput operation on the object.

In a variation of the aspect, the lifecycle data is Digital Product Passport (DPP) data that indicates one of a repair status of the object, a recycle status of the object, or one or more materials of the object.

In a variation of the aspect, the lifecycle data is derived from a Global Standards 1 (GS1) data link.

In yet another aspect, a non-transitory computer-readable medium may store instructions that, when executed by one or more processors, cause the one or more processors to perform any of the foregoing methods.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
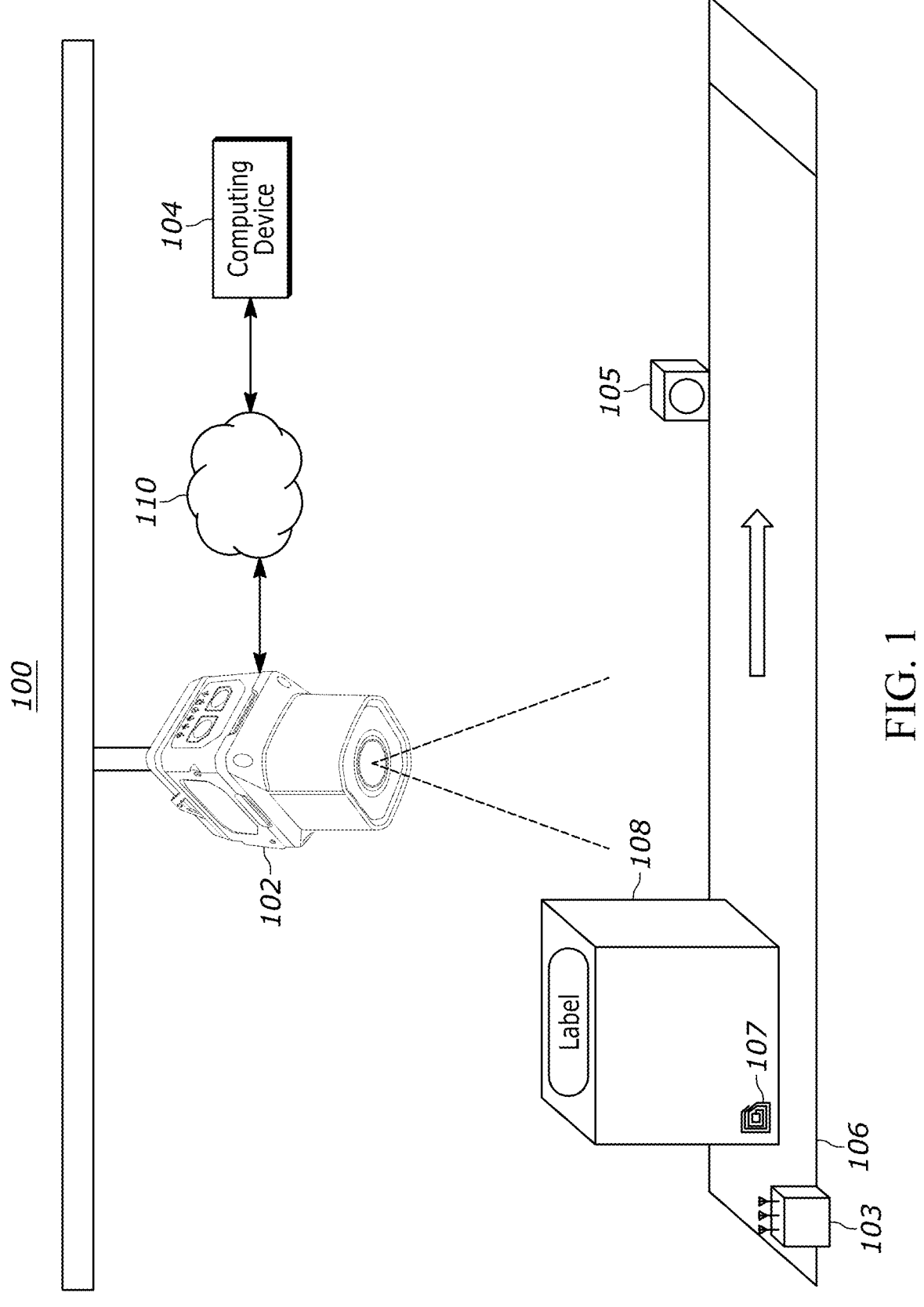
FIG. 1 an example environment in which systems and methods for configuring a data acquisition system, for, an imaging system, based on a sensed object type, according to embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Overview

The techniques herein allow for configuring one or more imager systems, such as machine vision systems, that employ multiple different imaging sensor types. The techniques may select an optimal sensor type from among a plurality of available sensor types and select the corresponding sensor parameters, either or both based on identifying the type of object that is to be analyzed by the machine vision system. That is, in various examples, machine vision systems that contain three-dimensional (3D) cameras and two-dimensional (2D) cameras can be configured, including during real-time operation, to engage different cameras to sensor an object. The object type is identified, for example, using a radio frequency identification (RFID) reader and object tag, based on identifying a visual indicator on the object captured in image data, scanning a barcode associated with the object, or other object type detection techniques. For example, an Electronic Product Code (EPC) determined from an RFID tag read may indicate that an incoming object is likely substantially two-dimensional, which may suggest an object type better suited to sensing by a 2D camera, or that EPC may indicate the object is substantially three-dimensional, such that a 3D camera may be better suited to sense the object. When the EPC information indicates that the object is substantially flat, the techniques herein may activate a single sensor (e.g., a 2D camera) within a multi-sensor array in order to reduce the generated data payload, increase the processing speed, and/or reduce the sensor power draw. Further, the techniques would select 2D sensor parameters, such as exposure, gain, and illumination, which are optimized for use with the selected 2D sensor. Once an optimal sensor type and corresponding parameters are selected, the system performs the desired machine vision sensing action on the object (e.g., fault detection, dimensioning, optical character recognition (OCR)).

The present techniques overcome numerous technical challenges faced by conventional systems. For example, the techniques can be used to configure an entire data acquisition system, such as an imaging system formed of multiple different imaging assemblies that are to sensor an object during a throughput cycle. Now, for example, an object type can be determined, in real time, as the object enters an imaging environment, such as a conveyor belt system, and the present techniques can select which sensors throughout that environment are to be used, and the present techniques determine the sensor configurations for each of these sensors. By performing the object type detection, sensor selection, and sensor configurations in real-time, the present techniques can greatly reduce the time necessary to tailor one or more imaging systems of that environment to operate on the object, while still maintaining designed imaging speeds and accuracy rates. In various examples, the techniques can provide even further configurability by determining which imaging system pathway system (e.g., which conveyor belt) is to be used to sense an object, altogether.

In these and other ways that will be apparent to those skilled in the art reading this disclosure, the present techniques are able to perform machine vision jobs (or other imaging tasks) are a faster rate that saves computing resources otherwise expended when determining imaging settings through convention techniques. The disclosed techniques further provide an improvement in the technical field of machine vision configuration as compared to conventional techniques which require user intervention to configure such systems. Thus, the computing resources and time required to configure a machine vision system is greatly reduced which allows throughput systems to operate at fast throughput speeds while (importantly) retaining the precision often demanded of machine vision systems. Sacrificing precision is particularly limiting for machine vision systems, which are commonly used for determining product defects, or other identifying other critical features of an object.

Example Environment

FIG. 1 depicts an example environment 100 in which systems and methods for configuring a data acquisition system, illustrated as an imaging system such as a machine vision system, according to embodiments. The example environment 100 may include at least one imaging device 102 communicatively coupled to at least one computing device 104 via a network 110.

The imaging device 102 may be or include one or more machine vision cameras. In particular, the imaging device 102 includes a plurality of image sensors at least some of which are of a different sensor modality. Examples of image sensors having different imaging modalities include 3D imaging devices, 2D imaging devices configured to capture 2D image data, 2D imaging devices configured to capture 3D image data (such as stereoscopic imaging). Various imaging modalities may themselves represent multiple different sensor modalities. For example, 3D imaging device may include pulsed-based time of flight (ToF) imaging devices, phase-based ToF imaging devices, and depth sensing devices. While the imaging device 102 is described as having multiple different image sensors of different modalities, such image sensors are each examples of a broader category of sensors. As noted in various embodiments, sensors and corresponding sensor modalities discussed herein may be one or more of an imaging-based (image) sensor, an RF-based sensor (such as a RFID reader), a thermal sensor (measuring thermal properties of an object), a color sensor, infrared (IR) sensor, and weight sensors. In some examples, a sensor may be represented by multiple sensor operating in a coordinated manner. This may include multiple sensors of the same modality or of different modalities. For example, a weight sensor may be used to perform an initial detection of the presence of an object within a vicinity and an RFID sensor may response by detecting an object type, or the converse may occur with the RFID sensor initially sensing the object and the weight sensor determining an object type (e.g., heavy or lightweight).

In the illustrated example, the imaging device 102 is configured to capture image data comprising one or more images of the field of view of the various image sensors within the device 102, and perform an imaging task on the captured images, such as a machine vision job. For example, the imaging device 102 may be positioned proximate a conveyor belt 106 transporting an object 108 and configured to capture images of the object 108 as it crosses the imaging device's 102 field of view to detect text on the object 108. The conveyor belt 106 may be a high throughput conveyor belt, thereby making the environment 100 a high throughput imaging environment.

In the illustrated example, the environment 100 includes other sensors, beyond the imaging device 102. A sensor 103 is positioned upstream to initially detect the object 108 and may be of a different sensor modality than that of the sensors within the imaging device 102. For example, the sensor 103 may be a fixed RFID reader configured to read an RFID tag 107 on, in, or otherwise associated with the object 108, where reading a payload from that RFID tag may be used by the sensor 103 or the computing device 104 to detect the object and determine an object type associated with the object. In other examples, the sensor 103 may be a handheld RFID reader. In yet other examples, the sensor 103 may be another imaging device, including another of the imaging device 102. A sensor 105 is positioned downstream of the imaging device 102 and may contain the same or a different sensor and sensor modality type than that contained within the imaging device 102. The second sensor 105 may be a fixed 2D camera, for example, or other imaging device. Both the sensor 103 and the sensor 105 may be communicatively coupled to the computing device 104 through the network 110 or through other communication means. Further, in some examples, one or both of the sensors 103 and 105 may be communicatively coupled directly to the imaging device 102.

In at least some embodiments, to perform a machine vision job, one or more operational parameters of the imaging device 102 may be contained in imager configuration data (e.g., one or more JSON files). The operational parameters of the imaging device 102 may be specific to each different image sensor (and each different sensor modality) within the imaging device. For example, operational parameters in the form of imager parameters for a 3D camera within the imaging device 102 may be different than imager parameters for a 2D camera within the imaging device 102. Imager parameters for a 2D camera may include, for example, exposure, focal distance, spatial resolution, the aperture, shutter speed, frame rate, sensor gain, image processing, illumination, a decoder, and/or other suitable operational parameters of the imaging device 102. Imager parameters may include pixel size, resolution, pixel depth, and gray scale. Imager parameters for a 3D camera may include some of the foregoing or other known parameters.

Imager configuration data may contain imager parameters that configure the image sensors within the imaging device 102 to perform optical character recognition (OCR) images of the object 108 to identify text or other symbology on the object (e.g., text associated with a label on the object 108), for example configuring hardware settings of the imaging device 102, settings of software/firmware/modules of the imaging device 102 performing the imaging task, machine vision jobs, etc. Imager configuration data may contain imager parameters that configure image sensors within the imaging device 102 to dimension the object 108, to identify defects in on the object 108, to determine a status of the object 108, such as whether the object 108 has been repaired or recycled, to determine an indicia type associated with the device such as a Digital Product Passport (DPP) code, a Global Standards 1 (GS1) digital link, etc.

In at least some embodiments, the imaging device 102 may perform the same imaging task (or machine vision job) as the computing device 104, such as executing the same imaging task of the computing device 104 on the imaging device 102 to perform the same OCR imaging task on a captured image. The imaging device 102 may load imager parameters into the imager to operate the particular imager for successfully perform a task of a job. The computing device 104 may generate imager configuration data (containing the imager parameters) based upon the object type, as discussed in various embodiments herein. That imager configuration data may include instructions imager parameters that are selected because of the object type, where different object types, will result in selection of different imager parameters and/or different values for the imager parameters. As discussed further herein, the computing device 104 may transmit to the imaging device 102 an indication of the selected imager and transmit imager parameters for use in operating that imager. The imaging devices 102 may receive the transmitted indication and activate the selected sensor. Further, the image devices 102 receiving the imager parameters will operate that activated imager using the imager parameters (and potentially other information) contained in the received imager configuration data.

Example Processing Platform

Figure 2:
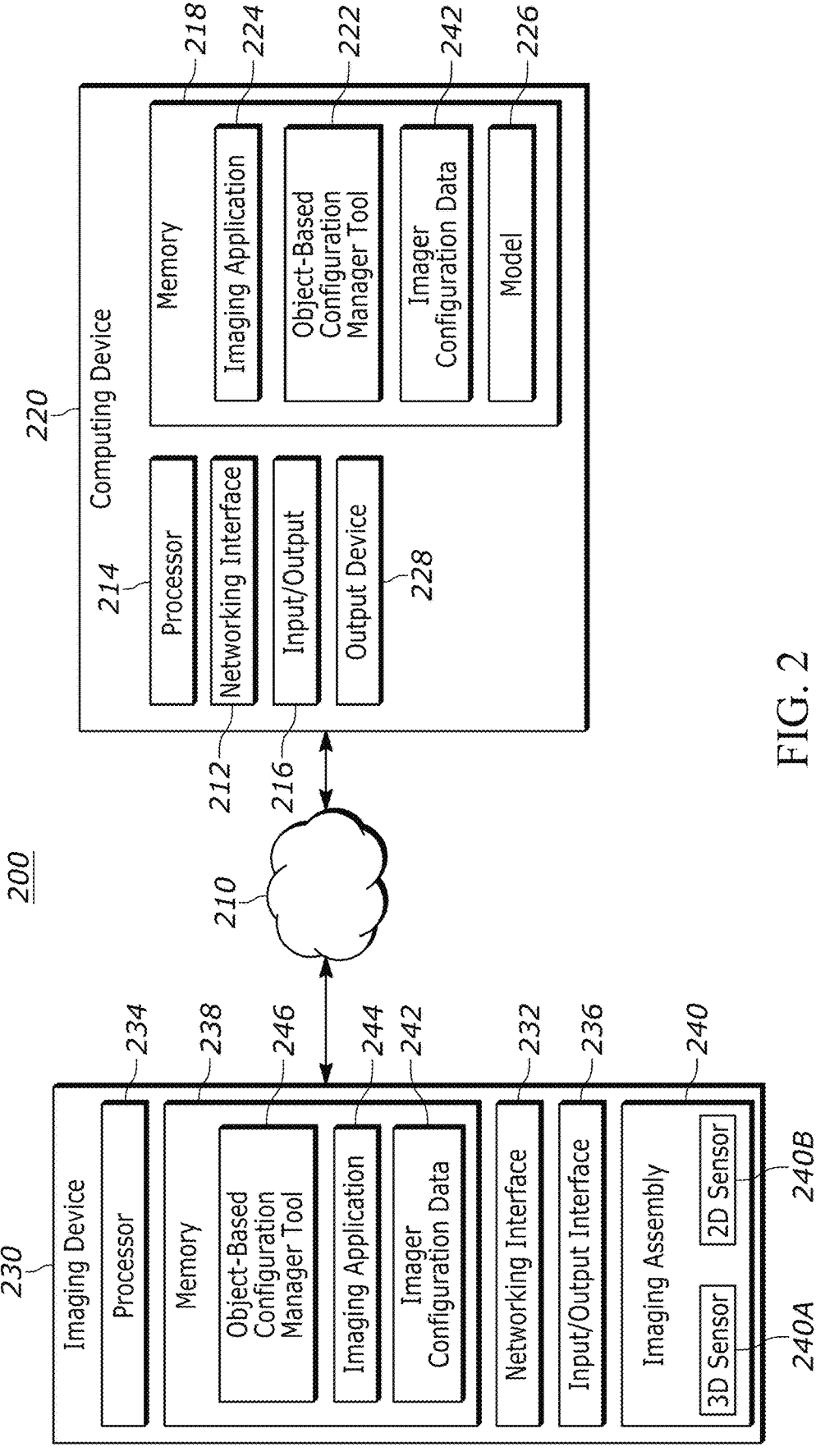
FIG. 2 is a block diagram depicting an example processing platform for implementing example methods and/or operations described herein, according to embodiments.

FIG. 2 is a block diagram depicting an example processing platform 200 for implementing example methods and/or operations described herein, according to embodiments. The example processing platform 200 includes a network 210 (e.g., the network 110), a computing device 220 (e.g., the computing device 104) and an imaging device 230 (e.g., the imaging device 102). Although the processing platform 200 is shown to include one network 210, one computing device 220, and one imaging device 230, it should be understood that the processing platform 200 may include additional, fewer, and/or alternate components, and may be configured to perform additional, fewer, or alternate actions, including components/actions described herein. Similarly, it should likewise be understood that the computing device 220 and/or imaging device 230 may include additional, fewer, and/or alternate components, and also may be configured to perform additional, fewer, and/or alternate actions, including the components and/or actions described herein. For example, the processing platform 200 may include a plurality of imaging devices 230, all of which may be interconnected via the network 210. Similarly, the computing device 220 may include multiple processors 214, and may not include an output device 228. Furthermore, it should be appreciated that additional and/or alternative connections between components shown in FIG. 2 may be implemented. As just one example, the computing device 220 and the imaging device 230 may be connected via a direct communication link (not shown in FIG. 2) instead of, or in addition to, via the network 210.

The network 210 may include at least one communication and/or data network to communicatively couple components of the processing platform 200, such as enabling bidirectional communication between the computing device 220 (e.g., via the network interface 212) and the imaging device 230, and/or any other suitable device. The network 210 may comprise any suitable network or networks, including a local area network (LAN), wide area network (WAN), Internet, or combination thereof. For example, the network 210 may include a wireless cellular service (e.g., 4G, 5G, etc.). In one aspect, the network 210 may comprise a cellular base station, such as cell tower(s), communicating to the one or more components of the processing platform 200 via wired/wireless communications based on any one or more of various mobile phone standards, including NMT, GSM, CDMA, UMMTS, LTE, 5G, or the like. Additionally, or alternatively, the network 210 may comprise one or more wired and/or wireless data buses, modems, routers, switches, or other such connection points communicating to the components of the processing platform 200, which may include wired and/or wireless communications based on any one or more of various standards, including by non-limiting example, IEEE standards (e.g., 802.3, 802.11b/g/n/ac/ax, etc.), Bluetooth, and/or the like.

The computing device 220 may include the network interface 212, a processor 214, an input/output (I/O) interface 216, a memory 218, and an output device 228, any and/or all of which may be interconnected via an address/data bus or otherwise communicatively connected.

The network interface 212 may enable communication by the computing device 220 via the network 210. The example network interface 212 may include any suitable type of communication interface(s) (e.g., wired and/or wireless interfaces) and be configured to operate in accordance with any suitable protocol(s). For example, in some embodiments, network interface 212 may transmit data or information (e.g., image data, payloads, etc.) between remote processor(s), the imaging device 230, and/or other components.

The processor 214 may include one or more processors such as a microprocessor (µP), microcontroller, central processing units (CPU) and/or graphics processing unit (GPU) and/or any suitable type of processor. The processor 214 may include one or more logical processors (e.g., virtual execution unit(s) having one or more threads) and/or physical processors (e.g., hardware execution units having one or more cores) and may include multitasking and/or parallel processing. The processor 214 may control overall operations of the computing device 220. For example, the processor 214 may interact with the memory 218 to obtain, execute, and/or store data and/or instructions (e.g., machine-executable instructions) related to an object-based configuration manager tool 222, imaging applications 224, one or more trainable models 226, the output device 228, and/or other component(s) of the computing device 220. Additionally, or alternatively, machine-readable instructions corresponding to the example operations described herein may be stored on one or more removable media (e.g., a compact disc, a digital versatile disc, removable flash memory, etc.) that may be communicatively coupled to the computing device 220 to provide access to the machine-readable instructions stored thereon. In particular, the instructions stored in the memory 218, when executed by the processor 214, may cause the processor 214 to receive and analyze data image data.

The I/O interface 216 may enable receipt of input (e.g., via a user interface) and/or communication of output data (e.g., to an output device). For example, the user may provide input to the computing device 220 using an interface device (e.g., a mouse, keyboard, touchscreen, etc.) to via the I/O interface 216.

The memory 218 may be accessible by the processor 214 (e.g., via a memory controller), and/or other components of the computing device 220 and/or the processing platform 200. The memory 218 may include one or more suitable storage media such as a magnetic storage device, a solid-state drive, random access memory, volatile memory, non-volatile (e.g., non-transitory) memory, a database, and/or any other suitable memory. The memory 218 may be a local memory included within the housing of the computing device 220, memory communicatively coupled to the computing device 220 (e.g., a database coupled via an address/data bus and/or the network 210). The memory 218 may contain instructions which may be executed by the processor 214 or otherwise computing device, such instructions may include one or more software applications (e.g., the imaging applications 224), algorithms, modules, decoders, models, images for updating models, and/or other suitable instructions. The memory may store image data, models (e.g., the model 226), imager configuration data, tool configuration data, and/or other suitable data.

The memory 218 may store one or more tools (e.g., applications), such as the object-based configuration manager tool 222 and the imaging applications 224. The imaging applications 224 may represent tools to be executed on an object (e.g., the object 108) sensed by the imaging device 230. Example imaging applications 224 include one or more imaging tasks, such as OCR of text, a machine vision task, etc., via the computing device 220.

The imaging applications 224 may include one or more settings, e.g., settings associated with performing an imaging task, machine vision job, etc. For example, the imaging applications 224 may render a GUI on a display (e.g., the output device 228 via the I/O interface 216) and/or other communicatively coupled device. A user may interact with the GUI to view and/or edit various settings of the imaging task, view images, input data, generate configuration data for the imaging device 230, etc. The imaging applications 224 may generate the configuration data for configuring one or more settings of the imaging applications 224, such as a confidence metric, an average character height, a text color, a contrast threshold, a character width, a character range, an ROI, a string match, text optimization, and/or other suitable settings.

The object-based configuration manager tool 222 may include instructions for selecting a sensor modality (e.g., an image sensor modality) and a corresponding sensor (e.g., an imager) of the imaging device 230 and transmitting instructions to the imaging device 230 to use that selected sensor in analyzing the object (e.g., the object 108). As discussed in various examples herein, the computing device 220 may receive an indication of an object type from a sensor and determine from that object type, which of a plurality of sensors at the imaging device 230 are appropriate for analyzing the object based on the object type. Further, the object-based configuration manager tool 222 may include instructions for determining some or all sensor parameters (e.g., the imager parameters 242) corresponding to the selected sensor modality/sensor, where those imager parameters are selected based on the object type. The computing device 220 communicates (via network 210) an identification of the selected sensor to the imaging device 230 and the determined sensor parameters to the imaging device 230, and the imaging device 230 uses such information in executing imaging applications 244 on the object. With the present techniques, those imaging applications 244 are now able to execute with greater accuracy and in some examples with greater speed and less resource demand. In various embodiments, the imaging applications 224 may generate a portion of the imager configuration data 242, as well, to further configure operational parameters of imaging device 230.

The memory 218 may store a trainable model 226. The model 226 may be, and/or include, one or machine learning models (e.g., a neural network), algorithms, and the like. In some aspects, the machine learning methods and algorithms may include, but are not limited to linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented machine learning methods and algorithms are directed toward at least one of a plurality of categorizations of machine learning, such as supervised learning, unsupervised learning, and reinforcement learning. In some aspects, the machine learning model may be a generative model, a large language (e.g., large language model), and/or a multimodal machine learning model. In at least some implementations, the model 226 may be configured to receive image data (e.g., images captured by the imaging device 230 of an object including text and symbology on a barcode) and control data, and in response generate the imager configuration data or configuration data for the imaging applications. The control data may include and/or indicate one or more of a description of the imaging task, imaging tool setting associated with performing the imaging task, or a schema for generating the tool configuration data for configuring the imaging tool settings. The tool configuration data may include and/or otherwise indicate one or more values for at least some of the plurality of settings based upon the control data and analysis of the image data. Although the model 224 is described as having certain functionalities, such functionalities may be performed by additional models. For example, a single model may analyze the image data, a second model may generate the tool configuration data, and a third model may generate device configuration data. The model 224 may be configured to perform other functions (e.g., decoding a barcode in the image data).

The model 226 may be training, retrained, and/or fine-tuned, especially in the context of a machine learning model. In at least some embodiments, a base model may be configured to generate a plurality of configuration datasets. The base mode may be fine-tuned to generate the model 226. The fine-tuning may cause the model 226 to have better performance (e.g., generate output data faster, use fewer computing resources, etc.) as compared to the performance of the base model. One or more devices of the processing platform 200 may store, configure, update, and/or operate the model 226. For example, in some implementations, a server train, fine-tune, or otherwise configure the model 226. The computing device 220 may receive the configured model 226, store the model 226 in the memory 218), execute the model 226 (e.g., via the imaging applications 224, etc.). In other implementations, the computing device 220 may configure, store, and/or operate the model 226.

In some examples, the model 226 may include a trained neural network trained to receive images captured by the imaging scanner 230, identify objects within the received images, and classify those objects. That neural network, for example, may be configured as a convolutional neural network employing a multiple layer classifier to assess identified image features and generate classifiers for the trained neural network.

In various examples, the model 226 may be trained to set and/or adjust various sensor parameters of the imaging scanner 230, to classify objects in received image data by object type, to dimension objects, to identify one or more properties of an object and classify the object by those properties, to scan a surface of the object, to determine an object status such as repair or recycle, to identify a type of indicia or code associated with a device such as a DPP code, GS1 link, etc.

In these ways, through the model 226, in various examples, the present techniques deploy one or more trained prediction models to assess received images of an object (with or without indicia) and classify those images to determine an object and object type, for identifying contextual configuration settings to use in selecting which image amongst a plurality of image sensors to use in analyzing an object and to configure operation of the imaging scanner 230 for that particular imager.

The trained models herein may be configured in a variety of ways. In some examples, a neural network may be a deep neural network and/or a convolutional neural network (CNN). In some examples, the neural network may be a distributed and scalable neural network. The neural network may be customized in a variety of manners, including providing a specific top layer such as but not limited to a logistics regression top layer. A convolutional neural network can be considered as a neural network that contains sets of nodes with tied parameters. A deep convolutional neural network can be considered as having a stacked structure with a plurality of layers. In examples herein, the neural network is described as having multiple layers, i.e., multiple stacked layers; however, any suitable configuration of neural network may be used.

CNNs, for example, are a machine learning type of predictive model that is particularly used for image recognition and classification. In the exemplary embodiments herein, for example, CNNs can operate on 2D or 3D images, where, for example, such images are represented as a matrix of pixel values within the image scan data. As described, the neural network (e.g., the CNNs) can be used to determine one or more classifications for a given image by passing the image through the series of computational operational layers. By training and utilizing these various layers, the CNN model can determine the probability that an image (or object(s) within an image) or physical image features belongs to a particular object type, class, etc. Trained CNN models can be persisted for restoration and use, and refined by further training. Trained models can reside on any in-premise computer volatile or non-volatile storage mediums such as RAM, flash storage, hard disk or similar storage hosted on cloud servers.

The output device 228 may be configured to receive (e.g., via the I/O interface 216) and/or output data, such as images of the image data, a GUI of the imaging applications 224, audio, video, texts, and/or other suitable data. The output device 228 may include one or more displays (e.g., LCD, LED, OLED), illumination devices/components (e.g., lights, LEDs), computing devices (e.g., mobile computing device, POS), and/or other suitable components to output data. Although the output device 228 is depicted as a component of the computing device 220, the output device 228 may be otherwise communicatively coupled to the processing platform and/or the computing device 220.

The imaging device 230 may include a network interface 232 (e.g., the network interface 212), a processor 234 (e.g., the processor 214), an I/O interface 236 (e.g., the I/O interface 216), a memory 238 (e.g., the memory 218) and an imaging assembly 240, any and/or all of which may be interconnected via an address/data bus or otherwise communicatively connected.

The network interface 212 may enable communication by the imaging device 230 with the computing device 220 and/or components of the processing platform 200. The processor 234 may be configured to control the imaging assembly 240, execute applications, and/or control overall operation of the imaging device 230. For example, the processor 234 may interact with the memory 238 to obtain, execute, and/or store data and/or instructions (e.g., machine-executable instructions) related to the imaging assembly 240, such as causing the imaging assembly 240 to capture images. The I/O interface 236 may enable receipt of input data (e.g., device configuration data) and/or output data (e.g., image data), e.g., to the computing device 220 via the network 210.

The memory 238 may be accessible by the processor 234 (e.g., via a memory controller), the imaging assembly 240 (e.g., via a controller), and/or other components of the imaging device 230 and/or the processing platform 200. The memory 238 may store image data, imager configuration data 242 (e.g., received from the imaging tool 222 via the computing device 220), applications and/or other suitable data.

The memory 238 may store an imaging application 244 that, when executed, causes the imaging device 230 to perform one or more imaging tasks, machine vision jobs, etc., such s=as those described in reference to the imaging applications 224. That is, in at least some embodiments, the imaging application 244 and the imaging application 224 may be the same, or similar, applications, e.g., the same application to perform the same imaging task using the same application settings.

The imaging assembly 240 may include a plurality of different image sensors, each having a different sensor modality and a controller. Two different image sensors 240A and 240B are shown in the illustrated example, but the imaging assembly 240 may contain any number of image sensors. In the illustrated example, the image sensor 240A is a 3D image sensor, and the image sensor 240B is one or more 2D image sensors. More generally, examples of the image sensors 240A and 240B having different imaging modalities include 3D imaging devices, 2D imaging devices configured to capture 2D image data, 2D imaging devices configured to capture 3D image data (such as stereoscopic imaging). Further, as noted above, various imaging modalities may themselves represent multiple different imaging modalities. For example, 3D imaging device may include pulsed-based ToF imaging devices, phase-based ToF imaging devices, and depth sensing devices.

Each of the image sensors 240A and 240B may be configured to capture image data comprising one or more images of a respective field of view (FOV) of each image sensor, e.g., a respective FOV including the object 108 on the conveyor belt 106. The image sensors may be and/or include a charge-coupled device (CCD) sensor, a complementary metal-oxide semiconductor (CMOS) sensor, a one-dimensional array of addressable image sensors, a two-dimensional array of addressable image sensors, a monochrome sensor, a color sensor, and/or any other suitable image sensor. Depending on the implementation, the image sensors may include a color sensor such as a vision camera in addition to and/or as an alternative to the monochrome sensor.

While not shown, the imaging assembly 240 may include one or more subcomponents, such as one or more controllers, and/or one or more imaging shutters (e.g., electronic and/or mechanical shutters configured to expose/shield the imaging sensor from the external environment). The one or more controllers may control and/or perform operations of the imaging assembly 240, in particular different operations of the image sensors 240A and 240B. The controller, the processor 234, and/or other suitable component may be configured to control the imaging assembly 240. The imaging assembly may include and/or be communicatively coupled to an illumination source (e.g., the illumination source) configured to emit illumination during a (predetermined) period corresponding to capturing image data via the imaging assembly 240, such as white light illumination, particular wavelengths (e.g., red wavelengths, IR) to suit the requirements of the imaging assemblies, etc. The imaging device 230 may have one or more operational parameters associated with illumination, a focal setting (e.g., focal distance to the object 108), an image sensor setting (e.g., contrast, resolution), image processing (e.g., image OCR, cropping, stitching), and/or other operational parameters. An adjustment or otherwise change may be made to one or more of the operation parameters of the imaging device 230 via the imager configuration data.

The imaging device 230 may load or otherwise implement (e.g., via the processor 234, the imaging application 244) the imager configuration data 242 to configure operational parameters (e.g., sensor parameters) of each of the image sensors 240A and 240B of the imaging device 230. In various examples, these sensor parameters are at least partially sensor modality specific, i.e., different sensor modalities have different sensor parameters. Example sensor parameters include, or are associated with, exposure, focal distance, spatial resolution, the aperture, shutter speed, sensor gain, image processing, illumination, decoder, etc. In some embodiments, the imaging device 230 may have operational parameters that are unique to the imaging device (i.e., custom features). For example, one imaging device 230 may be configured with operational parameters for OCR, and another imaging device 230 may be configured with operational parameters for object recognition. The imager configuration data 242 may be stored (e.g., in the memory 238) as, and/or include, one or more XML files, JSON files, Python code, and/or any other suitable data.

In at least some embodiments, the imager configuration data 242 is at least partially determined by an object-based configuration manager 246 also stored in the memory 238. The object-based configuration manager 246 may be the same or similar to the object-based configuration manager 222 at the computing device 220. In some examples, the computing device 220 communicates the latter to the imaging device 230, which stores the latter as the former. In operation, during runtime, the object-based configuration manager 246 may perform various methods and processes herein, including those described in FIGS. 4-7.

The imaging assembly 240 may be configured to capture image data which may comprise one or more images of a target object within the FOV, including, for example, packages, items, labels, and/or other target objects, which some examples includes merchandise available at retail/wholesale store, facility, or the like. The target objects may or may not include indicia, such as a barcode, a QR codes, a digital watermark, and/or other such indicia. The processor 234, the imaging application 244, the computing device 220, and/or other suitable component(s) of the processing platform 200 may analyze the captured image data of target objects and/or indicia passing through a FOV of the imaging assembly 240, e.g., for OCR of text, and/or any other suitable purpose.

Example Imaging Device

Figure 3:
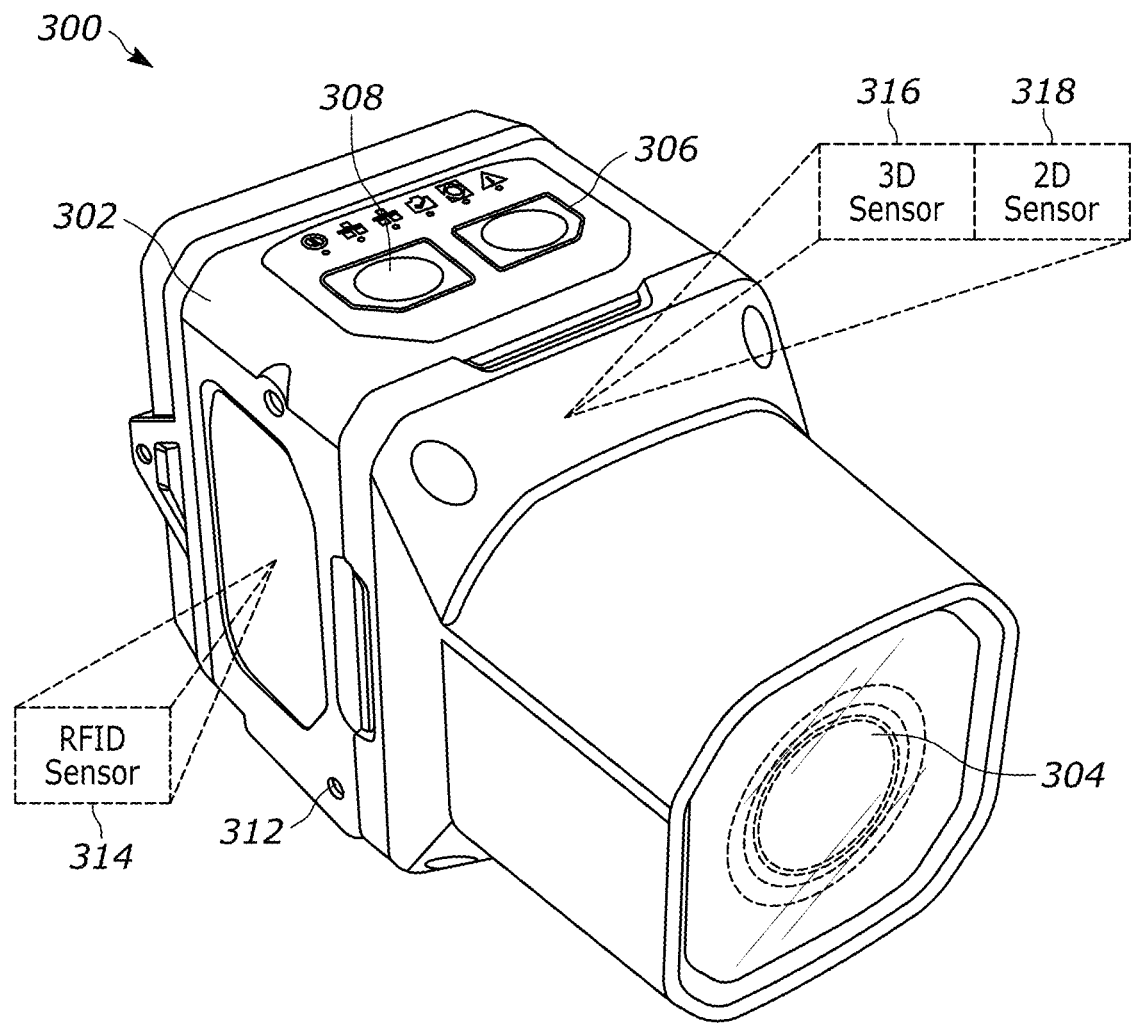
FIG. 3 is a perspective view of an example imaging device having multiple different sensor modalities and that may be used in the examples of FIGS. 1 and 2, according to embodiments.

FIG. 3 is a perspective view of an example imaging device 300 (e.g., the imaging device 102, imaging device 230), according to embodiments. The imaging device 300, such as a machine vision camera, may be implemented as an imaging device for machine vision applications (e.g., an imaging task) in accordance with embodiments described herein. The imaging device 300 includes a housing 302, an imaging aperture 304, a user interface 306, a dome switch/button 308, and mounting point(s) 312. Additionally, the imaging device 300 includes three different sensors, each of a different sensor modality. In the illustrated example, the imaging device 300 includes an RFID reader 314, a 3D image sensor 316, and one or more 2D image sensors 318.

Figure 4:
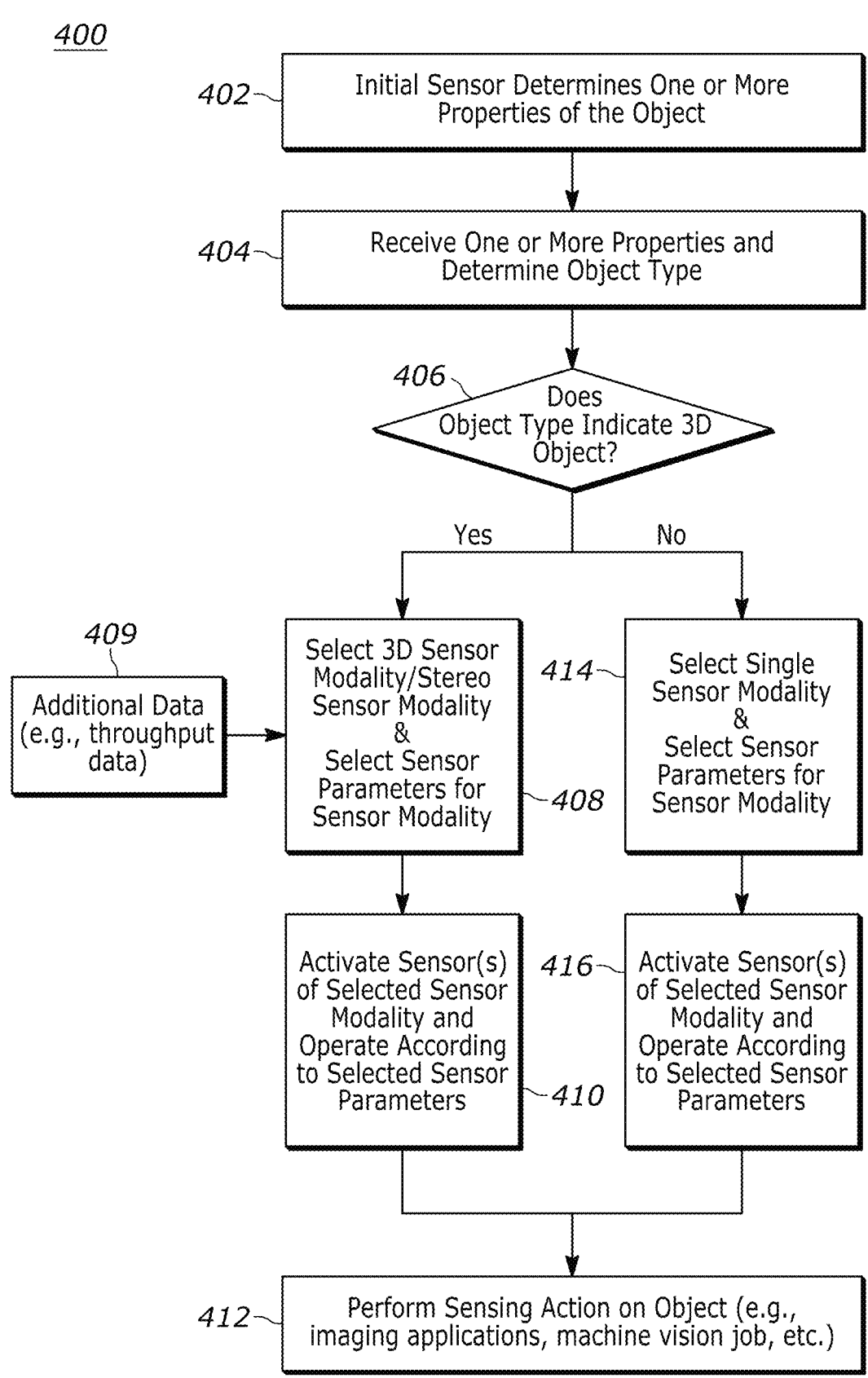
FIG. 4 is a flow diagram of an example method for configuring a data acquisition system based on a sensed object type, according to embodiments.

Example Methods for Configuring a Multi-Sensor Imaging System Based on Determined Object Properties FIG. 4 depicts a flow diagram of an example method 400 for configuring an imaging system, such as the conveyor belt system as shown in the environment 100, the imaging device 230 of the processing platform 200, and/or the imaging device 300. One or more blocks of the method 400 may be implemented as a set of instructions stored on a computer-readable memory (e.g., the memory 218) and executable via one or more local or remote processors (e.g., the processor 214, 234). At least a portion of the method 400 may be implemented via the processing platform 200, the computing device 220, the imaging device 230, and/or other electronic or electrical components, which may be communicatively coupled with one another.

In the illustrated example, the method 400 include, at block 402, sensing one or more properties of an object within a sensing field of a first sensor (e.g., the sensor 103 in the environment 100) or the RFID sensor 312 in the imaging devcie3 300. The method 400 may be implemented within a single imaging device formed with multiple different sensors. In other examples, some of the blocks in method 400 may be implemented across different devices, which then are configured to communicate with one another or with a centralized device, such as the computing device. The block 402 reads or receives data indicative of one or more properties of an object, via an initial sensor. In various examples, the sensor is an RFID sensor (e.g., RFID reader 103) that reads an RFID tag (e.g., RFID tag 107) associated with an object, where the payload of that RFID tag identifies one or more properties of the object. While various examples herein describe determining an object type, references to "object type" are intended to include any one or more object properties that may be used to identify the object, object type, and/or object classification, in comparison to other objects. In various embodiments, instead of an RF based sensor, the block 402 is achieved by operating an image-based sensor to capture images of an object and identify visual features of that object, where such features can be used to differentiate one object type from another object type. That is, in some examples, the block 402 is implemented by an imaging device (e.g., imaging device 102, 105, 230, or 300) capturing image data over a field of view and of the object, and then further identifying features of that object. In some examples, the block 402 is implemented by a barcode scanner implementing a scanning and decoding process, in which image data is captured, an indicia is identified, and a payload decoded from that indicia used to generate one or more properties of the object, such as object type. In various other examples, the block 402 may sense one or more properties of the object by scanning for or otherwise receiving data from IoT sensors associated with the device. The block 402 may initiate the process 400, for example, in response to a sensor detecting the presence of an object within a field of view or scanning region.

In the illustrated example, the information identifying the one or more properties of the object are transmitted to an object-based configuration manager tool (e.g., the manager tool 246 or the manager tool 222), and, at block 404, that manager tool determines an object type. In the illustrated example, that object-based configuration manager tool assesses whether the object type is determined to be a 3D object type or not, at a block 406. Parameters may be set for determining, at the block 404, what the object type may be. For example, an object-based configuration manager tool may store thresholds for various sensors to determine whether the object is a 3D object or not. For example, objects such as a thin, generally flat package may be identified as a 2D object by the block 404, despite that generally flat package having some depth. The types of objects to be identified at the block 404 and thresholds for each object type, stored or accessed via the block 404, may be stored in the object-based configuration manager tool and may be updated overtime. Indeed, in some examples, a trainable model may be used to implement the block 404, where that model has been trained to determine an object type based on previously received training data, which would include different data obtained at the block 402 as well as labeled data indicating an object type.

In the illustrated example, depending on the object type determined at block 406, one of two different sensor modalities are chosen. In the illustrated example, if the object is a 3D object (e.g., an object type), the control is passed to a block 408 where the object-based configuration manager tool selects a sensor, from the plurality of sensors, that sensor having a sensor modality optimized for analyzing the object based on the object type. In the illustrated, the block 408 selects a 3D sensor modality a stereo sensor modality, either of which may be able to properly analyze a 3D object. In some examples, the block 408, as with other similar control blocks here, may select the sensor modality for which optimized sensors correspond, or the block 408 may select the sensors known to correspond to the optimized sensor modality. The 3D sensor modality may correspond to a 3D image sensor. The stereo sensory modality may correspond to multiple 2D image sensors that can be operated in a stereo mode to sense a 3D object.

In various examples, the object-based configuration manager tool may be further configured to select between the different applicable sensor modalities of block 408 based on predetermined information, such as a predetermined ranked order of the applicable sensor modalities. In some examples, the object-based configuration manager tool may be configured to pole an imaging device and determine whether sensors are available for each of the applicable sensor modalities, for example. In the illustrated example, additional data 409 may be provided to the block 408 for determining which of the applicable sensor modalities to choose. For example, that additional data may be data on a desired throughput rate for an environment, such that the block 408 may determine the sensory modality that is better suited for achieving the desired throughput rate. For example, the additional data may be load data reflecting the number of objects passing through a conveyor belt system, or the speed with which the conveyor belt system is to perform a complete throughput operation on an object. The additional data 409 may be received from the computing device (e.g., the computing device 220) or from another data source communicatively coupled to the imaging device (e.g., the imaging device 230).

Once the sensor modality is selected, the block 408 further selects the sensor parameters for that sensor modality. In some examples, the object-based configuration manager tool determines the sensor parameters based on the object type determined at blocks 404, 406. For example, if a 3D sensor modality is selected, then the block 408 determines 3D sensor parameters.

With the sensor modality selected and sensor parameters selected, at a block 410, the sensors corresponding thereto are activated and, at a block 412, the corresponding sensing action is performed on the object. For example, at the block 412, one or more imaging applications, machine vision jobs, etc. may be performed on the object.

Returning to the block 406, if it is determined that the object is an object type other than a 3D object, control is passed to a block 414, which selects an applicable sensor modality based on that object type. In the illustrated example, the object-based configuration manager tool has configured to select a single sensor modality in particular a 2D image sensor of the imaging device to sense objects that are not identified as 3D objects. At the block 414, the object-based configuration manager tool select sensor parameters corresponding to the selected sensor modality, such as 2D image sensor parameters. As with the block 408, the block 414 may select the sensor modality for which optimized sensors correspond, or the block 414 may select the sensors known to correspond to the optimized sensor modality.

With the sensor modality selected and sensor parameters selected, at a block 414, the sensors corresponding thereto are activated and, at the block 412, the corresponding sensing action is performed on the object. For example, at the block 412, one or more imaging applications, machine vision jobs, etc. may be performed on the object.

Figure 5:
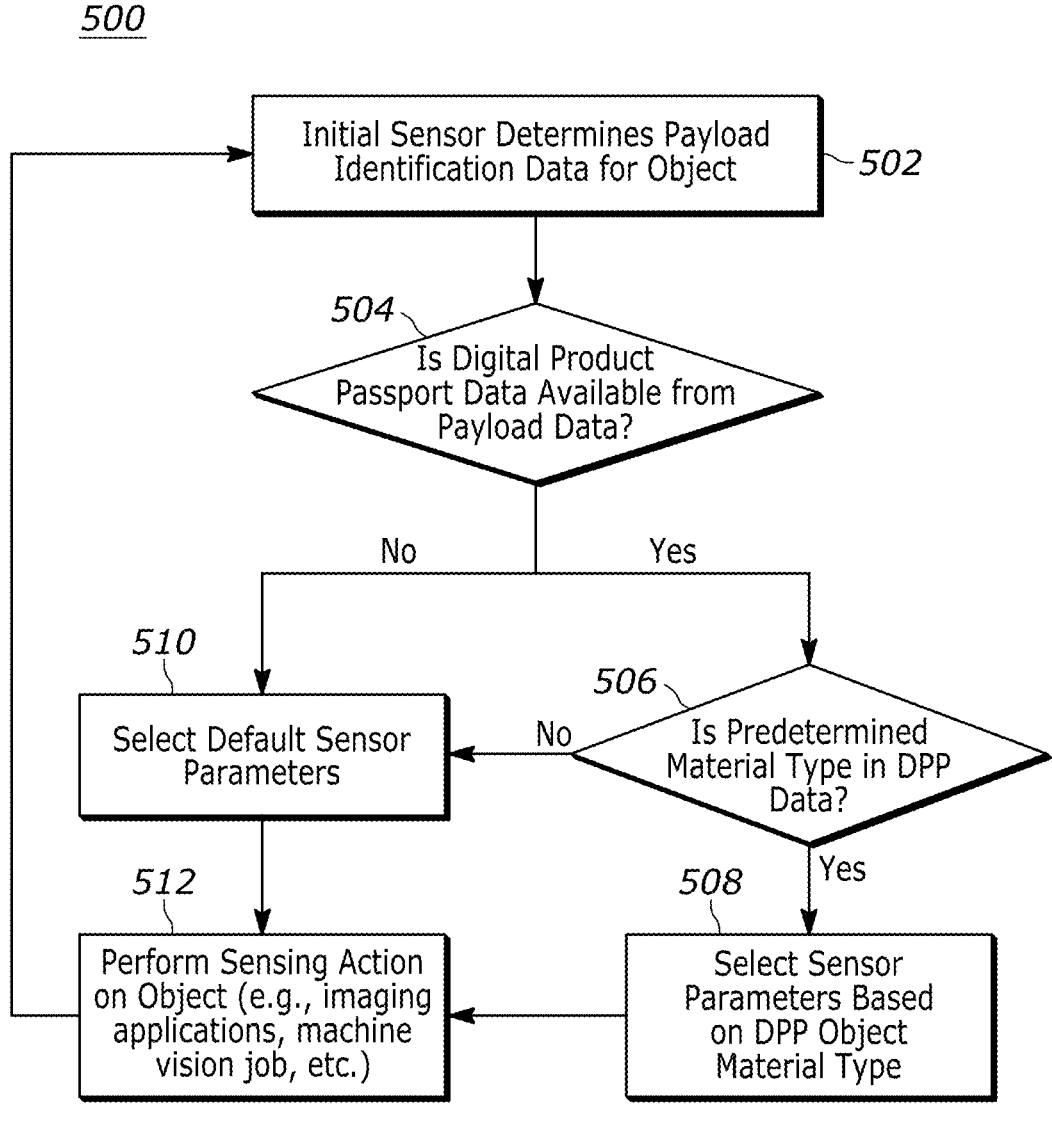
FIG. 5 is a flow diagram of an example method for configuring a data acquisition system based on an object status determined from a digital product passport data, according to embodiments.
Figure 6:
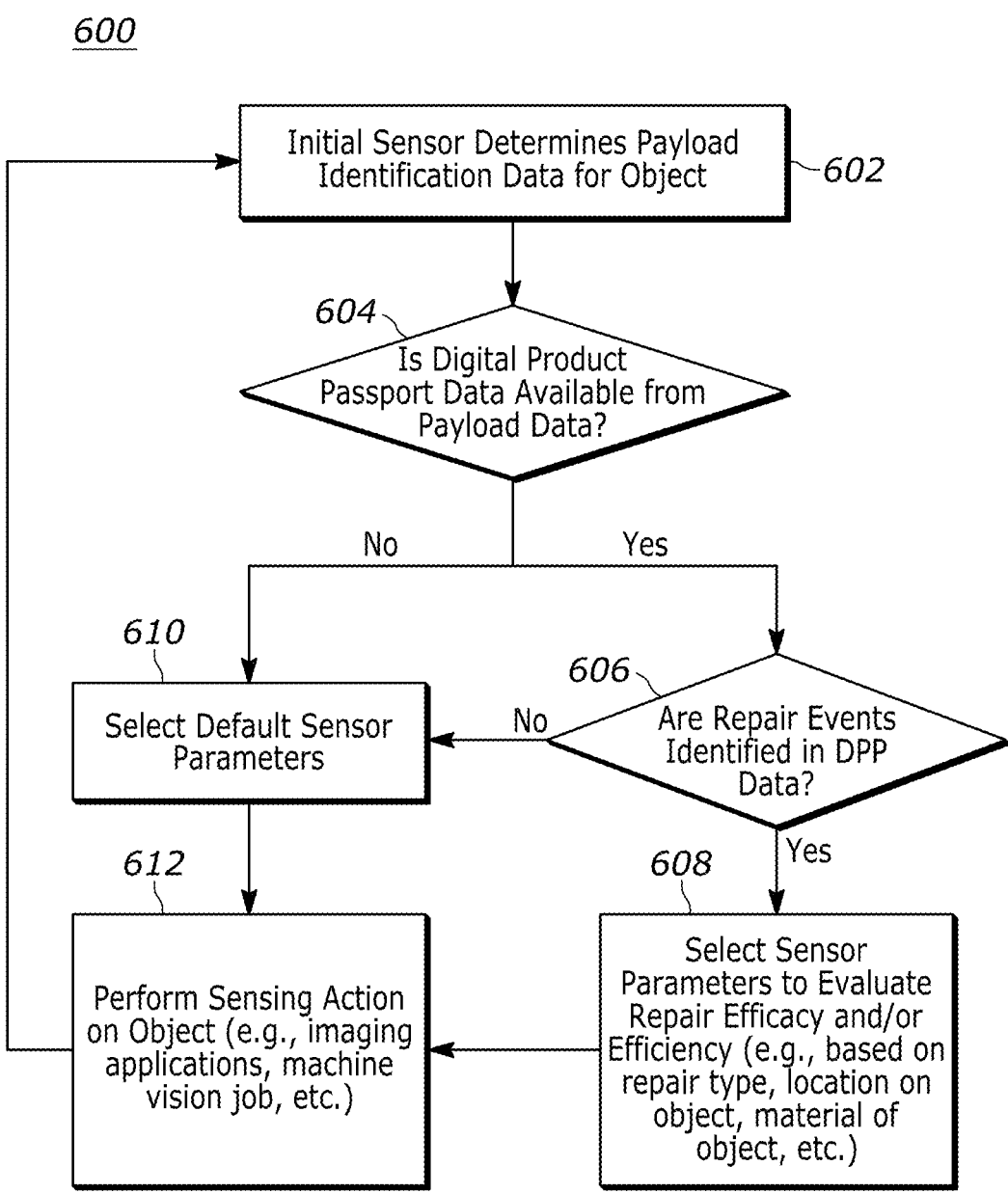
FIG. 6 is a flow diagram of another example method for configuring a data acquisition system based on an object status determined from a digital product passport data, according to embodiments.
Figure 7:
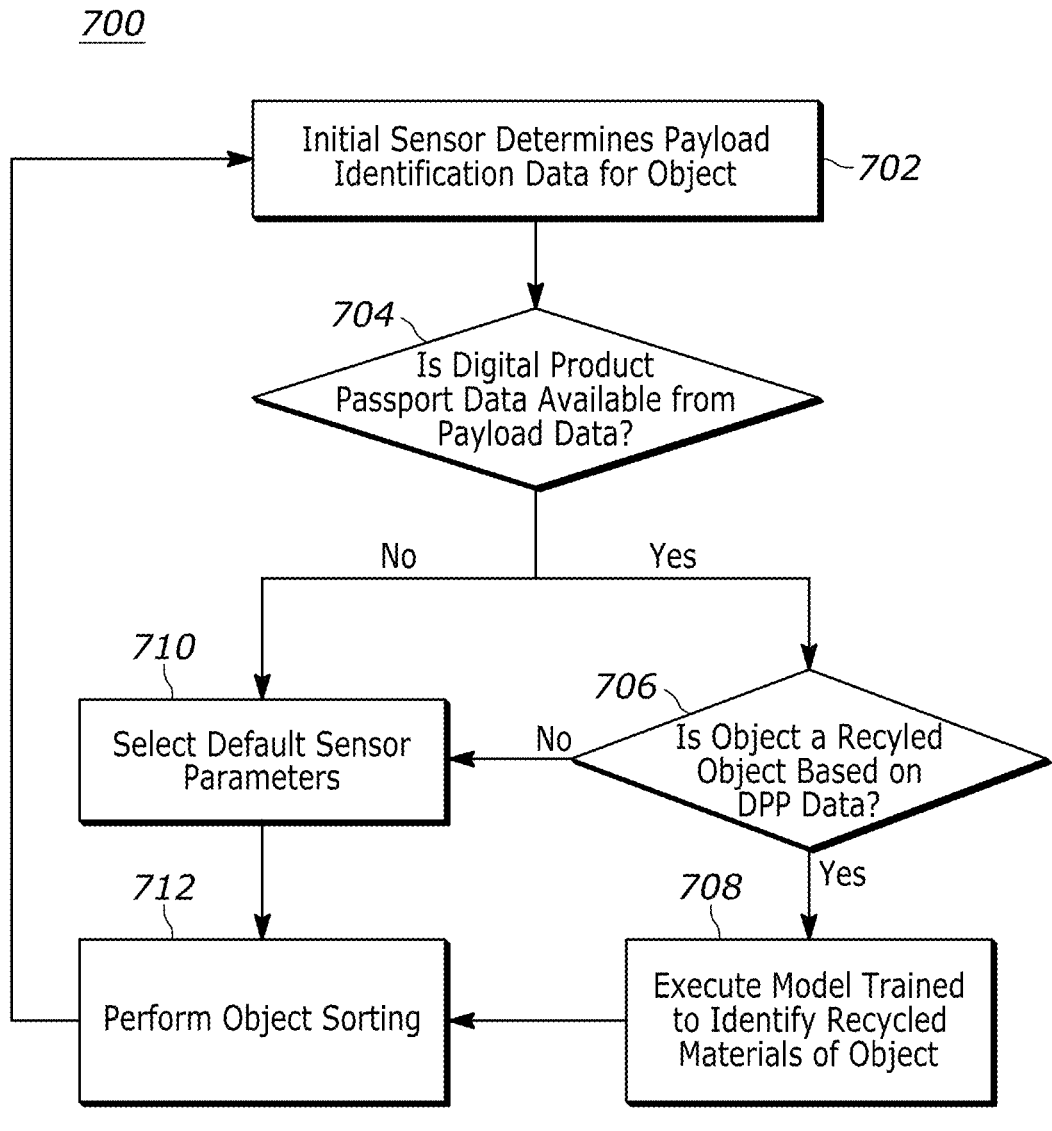
FIG. 7 is a flow diagram of yet another example method for configuring a data acquisition system based on an object status determined from a digital product passport data, according to embodiments.

FIGS. 5-7 illustrates flow diagrams of example methods particularly tailored for configuring an imaging system (e.g., the throughput conveyor belt system as shown in the environment 100, the imaging device 230 of the processing platform 200, and/or the imaging device 300) based on payload data obtained from sensor an object. In the illustrated examples, that payload data is a digital classifier data or other digital identifier data. More specifically, in the illustrated example, the payload data is a DPP, which is contains information about a objects lifecycle, including, in various examples, all or key materials of the object, the point of origin of the object, subsequent destinations of the object, a manufacturing process used to manufacture the object and/or its packaging, a repair status of the object, a recycle status of the object, environmental impact data for the object, disposal instructions for the object, or other data for identifying an object throughout its journey from production to end-of-life.

In FIGS. 5-7, example methods are described in reference to analyzing payload data in the form of a DPP code, which is supported by GS1 (see, gsl.eu/wp-content/uploads/2022/08/Digital_Product_Passport_Architecture_GSlinEurope_March_2022.pdf). More generally, references to DPP codes herein include any code, whether visually presented in an indicia or stored in a cloud or other architecture and determinable from a visually presented indicia or some combination thereof, that contains information on an item as well as information the lifecycle of that item, for example, through a supply chain. In that regard, references herein to DPP, may include DPP implemented in combination with GS1 standards. Furthermore, references herein to DPP shall be construed as including other information containing payloads, such as GS1 digital links, that can be used as part of an architecture that stores and accesses lifecycle information on an item. GS1 digital links, for example, are schema for encoding data in a barcode, such as a QR code, to contain both web addresses and perhaps serialized item identifiers (such as Global Trade Identification Numbers) (see, www.gsl-us.info/gsl-digital-link/).

FIG. 5 depicts a flow diagram of an example method 500 for configuring an imaging system based on one or more properties of an object as indicated in DPP data. At a block 502, similar to block 402, an initial sensor sensors a payload identification data source associated with the object. That payload identification data source may be an RFID tag and the initial sensor may be an RFID sensor. That payload identification data source may be an indicia, such as a 1D barcode, 2D barcode, 3D barcode, QR code, or other indicia. In such examples, the initial sensor may be an indicia reader, such as a fixed or handheld barcode reader. The payload of the data source is provided to a block 504, which determines whether the payload contains DPP data. For example, the object-based configuration manager tool at an imaging device (e.g., the manager tool 246) or at a computing device (e.g., the manager tool 222) may be configured to analyzed payload data from the block 502 and determine if that payload data is, contains, or otherwise corresponds to DPP formatted data.

In the example method 500, if the DPP data is available, a block 506 determines if the DPP data indicates a certain material type corresponding to the object, where the certain material type is predetermined. For example, the object-based configuration manager tool may be configured to look for one or more particular materials of an object as the properties of that object that will be used in determining a sensor modality and/or in determining sensor parameters to be used in sensing the object. Example materials may be chemicals that are rated as dangerous chemicals, materials that are high degradable, materials that are highly temperature dependent, materials that less or more visible depending on sensor modality used to sense them, materials that are highly reactive, materials that are fragile, materials that are banned or restricted by location, etc. If the block 506 determines that the materials identified in the DPP correspond to one or more predetermined materials, then control is passed to a block 508 where sensor parameters are selected based on the material type. From there control is passed to a block 512, which like block 412, performs a sensing action on the object, such as executing one or more imaging applications, machine vision jobs, etc. using the sensor parameters selected based on the DPP object material type.

If, at the block 504, it is determined that DPP data is not available, then control is passed to a block 510 where default sensor parameters are selected. Likewise, if the block 506 determines that the materials identified in the DPP data are not materials corresponding to predetermined materials, then control is passed to the block 510 where default sensor parameters are selected. From there control is passed to the block 512 for performing the sensing action on the object, using the default sensor settings.

While not shown, in some examples, the method 500 may further include selecting a sensor modality based on the DPP object material type, for example, at the block 508.

In the illustrated example, after the sensing action is performed at the block 512, control is returned to the block 502, although this need not be the case in all examples.

FIG. 6 depicts a flow diagram of an example method 600 for configuring an imaging system based on one or more properties of an object as indicated in DPP data. In the illustrated example, the method 600 is similar to that of method 500, which certain blocks performing similar functions and thus bearing similar reference numerals (block 602 being similar block 502, block 604 being similar to block 504, block 610 being similar to block 510, and block 612 being similar to block 512). Instead of determining whether the DPP contains information on a predetermined material, as performed by block 505 in method 500, in method 600, block 606 determines if one or more repair events are stored in the DPP data. That is, the method 600 assess an object status, instead of an object type, when configuring a sensor modality. As shown, if the block 606 determines that the DPP data includes repair events or data corresponding to repair events, then control is passed to block 608. At the block 608, the object-based configuration manager tool may determine sensor parameters specifically chosen to evaluate the repair, for example, to evaluate the efficacy (effectiveness) and/or efficiency of the repair. For example, such analysis may be based on the location of the repair (repair region) on the object. In some examples, the block 608 may receive object type data as well, which may be determined by processes described elsewhere herein but not shown, and that object type data may be used in selecting the appropriate sensor parameters at block 608. In any event, once the sensor parameters for evaluating the repair status of the object are obtained, those parameters are sent to the block 612 for performing the sensing operation on the object.

FIG. 7 depicts a flow diagram of an example method 700 for configuring an imaging system based on one or more properties of an object as indicated in DPP data. In the illustrated example, the method 700 is similar to that of method 500, which certain blocks performing similar functions and thus bearing similar reference numerals (block 702 being similar block 502, block 704 being similar to block 504, and block 710 being similar to block 710. Instead of determining whether the DPP contains information on a predetermined material, as performed by block 505 in method 500, in method 700, block 706 determines from the DPP data if the object status is recycled, i.e., if the object is a recycled object. As shown, if the block 706 determines that the DPP data indicates the object is a recycled object, control is passed to block 708, otherwise control is passed to block 710.

At the block 708, the object-based configuration manager tool may instruct the imaging device to execute a particular imaging application, in particular one designed to recognize recycled materials. More specifically the block 708 may instruct the computing device 220 to activate a model (e.g., the model 226) trained to classify an object as being a recycled object. That model may then be executed, for example, as a machine vision job, to analyze image data captured by the imaging device (e.g., the imaging device 230) to determine if the object is a recycled object or not. The block 708 may execute a model trained to classify an object as having a recycle status or not. In some examples, the model(s) at block 708 may further identify properties of the recycled object. For example, the block 708 may determine one or more materials of the object after determining that the object is a recycled object. In such examples, control may be passed to a block 712, which performs an object sorting based on the recycle status and the identified materials determined at the block 708. Control is otherwise passed to the block 712 from the block 710 in response to the object not having DPP data (as determined by block 704) or the object not being a recycled object (as determined at block 706). In this way, different objects may be sorted from other objects based on whether the object is a recycled object or not (i.e., based on an object's status) and based on materials or some other property of the recycled object (i.e., based on an object type).

Not all blocks of the exemplary flow diagrams of FIGS. 4-7 are required to be performed. Additionally, the methods 400, 500, 600, and 700 may include fewer, additional, and/or other steps than those depicted in corresponding FIGS. 4-7.

Thus, as shown in the methods illustrated in FIGS. 4-7, the present techniques provide for configuring an imaging system based on a determined status of an object as contained in a digital indication, such as a DPP. Based on the object status, sensor parameters are determined and then used to affect sensing of the object by the imaging system. The methods are adaptable and can allow for determining both object type from sensed data and include that object type with the object status determined from the DPP data, to determine sensor parameters.

Advantageously, the methods herein (including those of FIGS. 4-7, may be deployed to configure imaging systems, such as conveyor belt systems, as example of which is shown in the environment 100 of FIG. 1. For example, while these methods may be performed entirely within an imaging device having multiple sensors/sensor modalities therein, in other examples, the methods may be used to configure a plurality of different imaging devices positioned throughout an imaging system. For example, the sensor 103 may be used to determine an object type, DPP status, and/or object status, and that information may be communicated directly to the imaging device 102 for selecting a sensor modality therein and for selecting sensor parameters, both based on that sensed object type, DPP status, and/or object status. Yet, also, the determination for the sensor 103 may be communicated to the computing device 104 which may determine which of the two imaging devices 102 and 105 to select as the corresponding sensor modality and determine the sensor parameters for that imaging device 102/105. Furthermore, in any of the methods herein the selection of the sensor modality and/or sensor parameters may additionally be affected data from the imaging system, such as a desired throughput rate, number of different imaging devices in the imaging system, and the number of different conveyor pathways available.

Furthermore, the present techniques can be used to generate report data on the selected sensor modalities, sensors, and senor parameters. The determinations made by the object-based configuration manager herein can be stored in memory (e.g., at a computing device, an imaging devices, a server, or otherwise) and used for generating a throughput report containing a description of the assigned plurality of sensors and the configurations (e.g., sensor parameters) at which they were operated on an object. Such data may be stored with an indication of the object, as well, in some examples. Such data may be provided to an encoding computing system, for example, one configured to update DPP or other digital data associated with an object. In these ways, the present techniques may be used to update digital data for objects, report to a customer on throughput operations of an imaging system, or provide other real-time data on operations of an imaging system sensing one or more objects.

ADDITIONAL CONSIDERATIONS

The various embodiments described above can be combined to provide further embodiments. All U.S. patents, U.S. patent application publications, U.S. patent application, foreign patents, foreign patent application and non-patent publications referred to in this specification and/or listed in the Application Data Sheet are incorporated herein by reference, in their respective entireties, for all purposes. Implementations of the embodiments can be modified if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term " " is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one implementation" or "an implementation" means that a particular element, feature, structure, or characteristic described in connection with the implementation is included in at least one implementation. The appearances of the phrase "in one implementation" in various places in the specification are not necessarily all referring to the same implementation.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or"

refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the implementations herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular implementations and applications have been illustrated and described, it is to be understood that the disclosed implementations are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A data acquisition system comprising:
a first sensor configured to determine an object type of an object;
a plurality of sensors each configured to capture data corresponding to one or more properties of the object, each of the plurality of sensors using a different sensor modality;
a processor and a memory storing instructions that, when executed, cause the processor to:
responsive to a determination of the object type, select, from the plurality of sensors, a sensor having a modality optimized for analyzing the object based on the object type; and
execute a machine vision job based on the sensor modality and based on the object type.

2. The data acquisition system of claim 1, wherein the machine vision job is selected from a plurality of machine vision jobs based on the sensor modality and based on the object type.

3. The data acquisition system of claim 1, wherein the plurality of sensors are contained within an imager assembly.

4. The data acquisition system of claim 1, wherein each of the plurality of sensors are contained within a separate imager assembly.

5. The data acquisition system of claim 1, wherein the first sensor is contained within an imager assembly separate from the plurality of sensors, and wherein the first sensor has a sensor modality that is different from each of the sensor modalities of the plurality of sensors.

6. The data acquisition system of claim 1, wherein the first sensor is selected from a group consisting of a radio frequency identification (RFID) reader, an imaging sensor, and a barcode reader.

7. The data acquisition system of claim 1, wherein the instructions that, when executed, cause the processor to select the sensor comprise selecting one or more sensors from the plurality of sensors.

8. The data acquisition system of claim 1, wherein the instructions that, when executed, cause the processor to select the sensor comprise selecting each of the plurality of sensors.

9. The data acquisition system of claim 1, wherein each of the plurality of sensors corresponds to a different imaging devices.

10. The data acquisition system of claim 1, wherein the instructions that, when executed, cause the processor to select the sensor comprise instructions to select sensor parameters for operating the sensor having the modality optimized for analyzing the object.

11. The data acquisition system of claim 10, wherein the plurality sensors comprise at least one three-dimensional (3D) image sensor and at least one two-dimensional (2D) image sensor, and wherein the sensor parameters comprise at least one of exposure, gain, and illumination.

12. A method for configuring a data acquisition system having a plurality of sensors, the method comprising:
determining, via a first sensor, an object type;
responsive to a determination of the object type, selecting from a plurality of sensors each using a different sensor modality, a sensor having a modality optimized for analyzing the object based on the object type; and
executing, on that data acquisition system, a machine vision job selected based on the sensor modality and based on the object type, to analyze the object.

13. The method of claim 12, wherein executing the machine vision job comprises selecting the machine vision job, from a plurality of machine vision jobs, based on the sensor modality and based on the object type.

14. The method of claim 12, wherein selecting the sensor further comprises:
selecting one or more sensors from the plurality of sensors.

15. The method of claim 12, wherein selecting the sensor further comprises:
selecting each of the plurality of sensors.

16. The method of claim 12, wherein selecting the sensor further comprises:
selecting one or more sensors from a plurality of different imaging devices.

17. The method of claim 12, further comprising selecting sensor parameters for operating the sensor having the modality optimized for analyzing the object.

18. A method for configuring a data acquisition system having a plurality of sensors, the method comprising:
determining, via a first sensor, a payload data of an object;
determining, whether the payload data contains lifecycle data for the object;
responsive to a determination of the payload data containing the lifecycle data, selecting sensor parameters based on the lifecycle data and activating a sensor according to the selected sensor parameters based on the lifecycle data; and
executing a machine vision job to analyze the object.

19. The method of claim 18, further comprising responsive to the payload data not containing the lifecycle data, selecting default sensor parameters and activating the sensor according to the default sensor parameters.

20. The method of claim 18, wherein the lifecycle data is Digital Product Passport (DPP) data that indicates one of a repair status of the object, a recycle status of the object, or one or more materials of the object.

21. The method of claim 18, wherein the lifecycle data is DPP data that indicates one or more materials of the object, wherein selecting the sensor parameters based on the lifecycle data comprises selecting the sensor parameters based on the one or more materials of the object.

22. The method of claim 18, wherein the lifecycle data is DPP data that indicates a repair status of the object, wherein selecting the sensor parameters based on the lifecycle data comprises selecting the sensor parameters to evaluate the repair status of the object.

23. The method of claim 18, wherein the lifecycle data is DPP data that indicates the recycle status of the object, wherein selecting the sensor parameters based on the lifecycle data comprises selecting the sensor parameters based on the recycle status.

24. The method of claim 18, wherein the lifecycle data is derived from a Global Standards 1 (GS1) data link.

25. The method of claim 18, wherein the payload data is a radio frequency identification (RFID) tag data or a payload derived from an indicia.

26. A method for configuring a data acquisition system having a plurality of sensors, the method comprising:

determining, at a first sensor, a payload data of an object;

determining, whether the payload data contains lifecycle data for the object;

responsive to the payload data containing the lifecycle data, determining an object status and executing a model trained to assess one or more lifecycle-based properties of the object;

responsive to the payload data not containing lifecycle data, selecting default properties;

feeding the one or more lifecycle-based properties of the object or the default properties to a throughput system; and performing a throughput operation on the object using the throughput system.

27. The method of claim 26, further comprising:

responsive to the payload data not containing lifecycle DPP data, selecting default properties; and feeding the default properties to the throughput system for performing the throughput operation on the object.

28. The method of claim 26, wherein the lifecycle data is Digital Product Passport (DPP) data that indicates one of a repair status of the object, a recycle status of the object, or one or more materials of the object.

29. The method of claim 26, wherein the lifecycle data is derived from a Global Standards 1 (GS1) data link.

\* \* \* \* \*